United States Patent [19]

Chen

[11] Patent Number: 5,290,073
[45] Date of Patent: Mar. 1, 1994

[54] EXPANSION SEAL FOR CABLE PIPE

[76] Inventor: Chung F. Chen, 26272 Tarrasa La., Mission Viejo, Calif. 92691

[21] Appl. No.: 862,133

[22] Filed: Apr. 2, 1992

[51] Int. Cl.$^5$ .......................... F16L 39/00; F16J 15/10
[52] U.S. Cl. .................... 285/137.1; 285/216; 285/338; 277/104; 277/192
[58] Field of Search .............. 138/89; 174/70 R; 220/235, 237; 285/214, 216, 137.1, 346, 338, 139, 109; 277/104, 105, 192, 199

[56] References Cited

U.S. PATENT DOCUMENTS

| | | | |
|---|---|---|---|
| 1,777,564 | 10/1930 | Hosmer | 285/139 |
| 3,045,830 | 7/1962 | Fulton | 285/139 |
| 3,528,668 | 9/1970 | Barton | 285/346 |
| 3,582,096 | 6/1971 | Norton | 285/137.1 |
| 3,649,034 | 3/1972 | Barton | 285/346 |
| 3,703,297 | 11/1972 | Gignal | 285/346 |
| 4,377,291 | 3/1983 | Albertini | 285/137.1 |
| 4,842,364 | 6/1989 | Chen | 174/70 R |
| 5,035,265 | 7/1991 | Chen | 138/89 |
| 5,044,403 | 9/1991 | Chen | 138/89 |
| 5,052,726 | 10/1991 | Logsdon | 285/338 |

Primary Examiner—Eric K. Nicholson
Attorney, Agent, or Firm—Lowe, Price, LeBlanc & Becker

[57] ABSTRACT

An expansion seal for sealing pipe through which electrical cables are arranged to pass comprises an elastic ring, a plurality of upper clamping plates and a plurality of lower clamping plates each preferably of plastics or rubber material. The elastic ring is supported between a plurality of the upper and lower clamping plates, at the circumference of this elastic ring having a slit to allow insertion of cable therein and to cover the cable easily. The elastic ring and cable is locatable in a cable pipe and fixed at one end of the cable pipe by screw bolts. When the bolts are tightened addition a compressive force on the upper clamping plates the elastic ring extends inwardly to fill the space between the inner wall of the elastic ring and cable and outwardly to fill the space between the elastic sealing ring and inner surface of the cable pipe, to prevent liquid, mud and moisture from entering into the cable pipe. Conveniently, the expansion seal can be applied to pipes of different inner diameter and cable of different outer diameters.

8 Claims, 12 Drawing Sheets

EXPANSION SEAL FOR CABLE PIPE

BACKGROUND OF THE INVENTION

This invention relates to an expansion seal for cable pipe.

An expansion seal can be applied to different diameter cable pipe by the expansion force of an elastic sealing ring hereinafter referred to as elastic ring to seal the pipe to prevent liquid or moisture entering into the cable pipe. The expansion seal can have a simplified structure and can be installed or separated quickly by fastening or loosening bolts without changing any element.

In general, the same nominal external diameter electric cable pipes or transmission pipes may have a different inner diameter because of different manufacturing tolerance, the difference ratio always being below 10%. The end of the cable pipe should be sealed to prevent liquid, mud or moisture entering the cable pipe, otherwise, the cable may be damaged and an operator's life put in peril. Thus it is necessary to provide seals of various sizes to apply for different diameters of cable pipe. This raises manufacturing costs and causes operative inconvenience or disturbance.

SUMMARY OF THE INVENTION

It is therefore an object of this invention to provide an expansion seal for cable pipe comprising a plurality of upper and lower clamping plates having frusto conical surfaces thereon, an elastic ring located between the upper and lower clamping plates and having a slit formed in the elastic ring at an angle relative the axis of the ring, a plurality of symmetrical through holes located parallel to the said axis, slant faces on the upper surface and the lower surface of the elastic ring having advanced angles which form slant faces at the inner circumference and the outer circumference of the elastic ring; and a plurality of connecting elements arranged to interconnect the elastic ring, the upper clamping plates and the lower clamping plates.

In one embodiment of an expansion seal in accordance with the present invention the elastic ring of the expansion seal is fitted with different diameter pipe sleeves which can be cut respectively forming a slant lie and can be combined in various dimensions by adding or removing diameter pipe sleeves so as to cover the different diameter cable easily.

In a further embodiment of the invention there is provided an expansion seal for a cable pipe, wherein the elastic ring can be manufactured with either a single fitting hole, two fitting holes, three fitting holes or four fitting holes, so that the expansion seal can be arranged to support cable pipe having a plurality of cables.

The expansion ring can be applied for various ratios (below 10%) of cable pipe to diameter of cable (within 20 mm). The plurality of upper clamping plates, the plurality of lower clamping plates and the elastic ring are connected together by bolts and nuts, so that upon fastening the bolts, the elastic ring is expanded outwardly.

BRIEF DESCRIPTION OF THE DRAWINGS

Embodiments of an expansion seal for cable pipe in accordance with the present invention will now be described by way of example, with reference to the accompanying drawings, in which.

DETAILED DESCRIPTION OF THE PREFERRED EMBODIMENT

Figure 2:
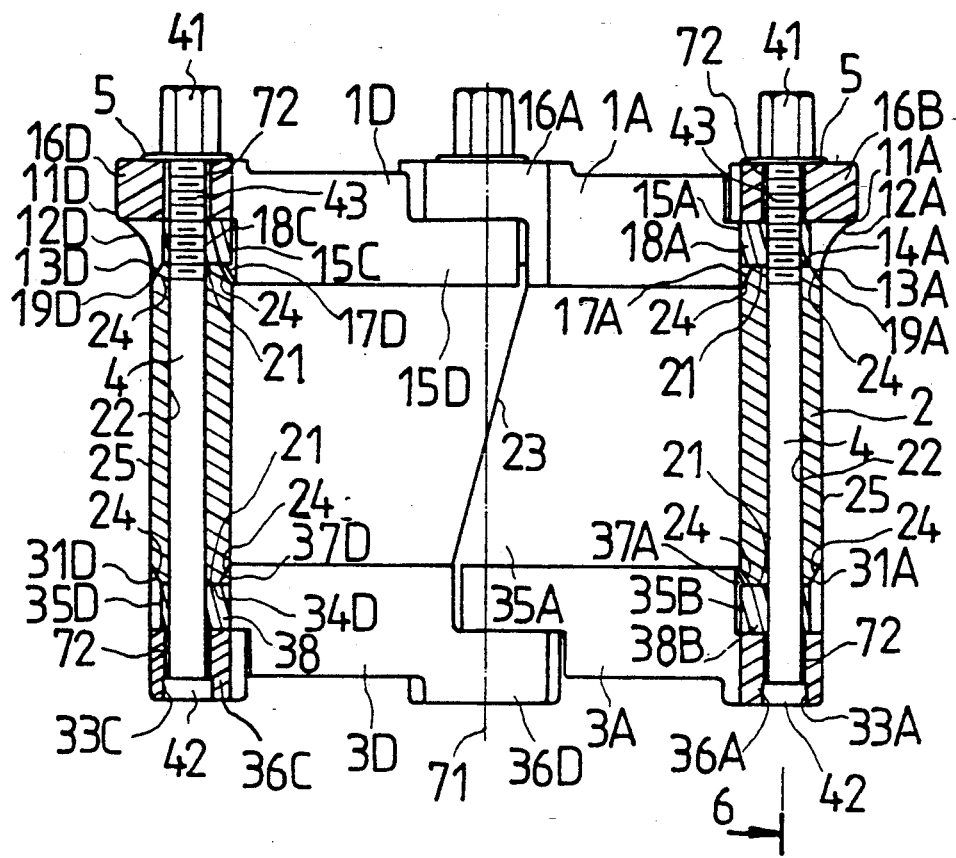
FIG. 2 is a sectional view on line 2—2 of FIG. 1.

Referring to FIG. 2 there is shown an expansion seal for cable pipe having a plurality of upper clamping plates (1), a plurality of lower clamping plates (3), (see FIG. 8) an elastic ring (2), a plurality of bolts (4), a plurality of the gaskets (5) and a plurality of pipe sleeves (6). The elastic ring (2) can be held between the upper clamping plates (1) and the lower clamping plates (3), the upper surface and lower surface (21) of the elastic ring (2) being curved.

Figure 7:
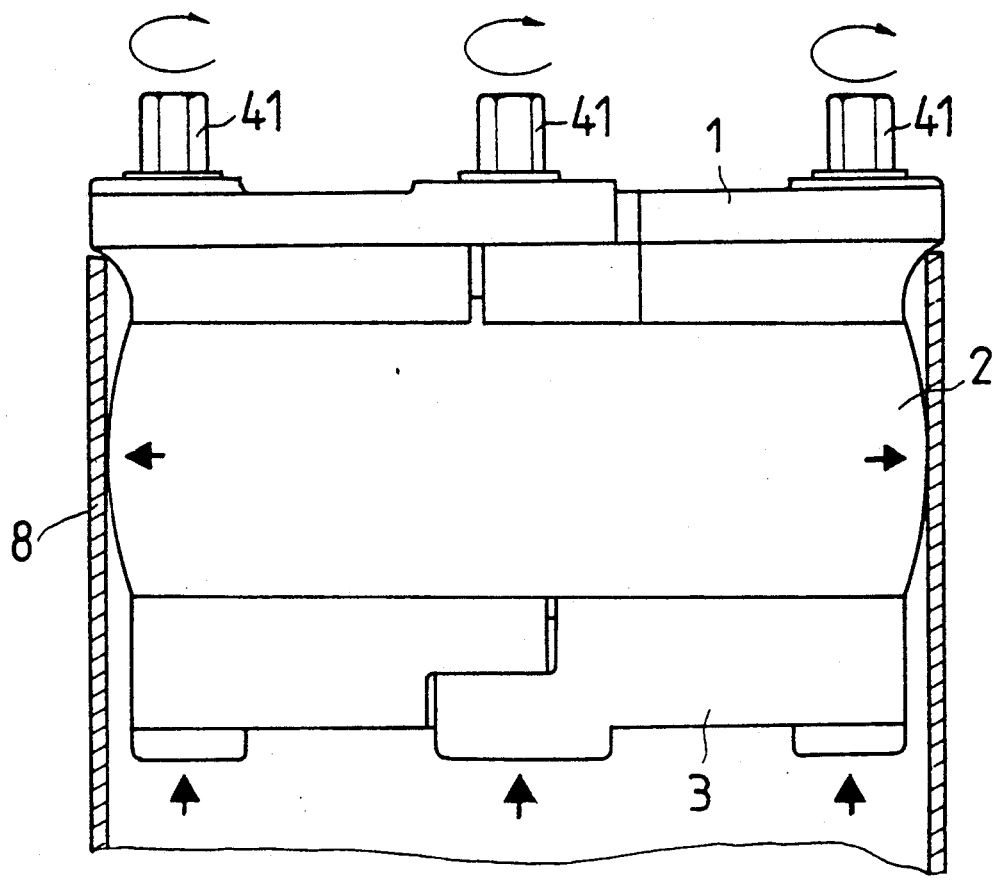
FIG. 7 is another embodiment of an expansion seal of this invention.

According to the circumferential outline of the upper clamping plates (1) and the lower clamping plates (3), the surface (14) of the upper clamping plates (1) and the surface (34) of the lower clamping plates (3) will contact the upper surface and lower surface (21), respectively, of the elastic ring (2), so that the compressive force can distribute over the surface (21). The upper clamping plates (1) have a plurality of holes (72) and the lower clamping plates (3) have a plurality of recess holes (33) which are symmetrical to the holes (72) of the upper clamping plates (1) in an axial direction of the elastic ring (2) itself having a plurality of through holes (22) symmetrical to the holes (72) and the recess holes (33). Therefore, the upper clamping plates (1), the lower clamping plates (3) and the elastic ring (2) can be connected with each other by the bolts (4) with matching nuts (41) when a compressive force is added by tightening the bolts (4), the elastic ring (2) will be expanded outwardly until it contacts the inner wall (81) of the cable pipe thereby forming a seal to prevent liquid, mud or moisture entering into the cable pipe as shown in FIG. 7. The elastic ring (2) can be cut to form a slit (23) slanted so that elastic ring (2) can be formed into rectangular shape.

Figure 8:
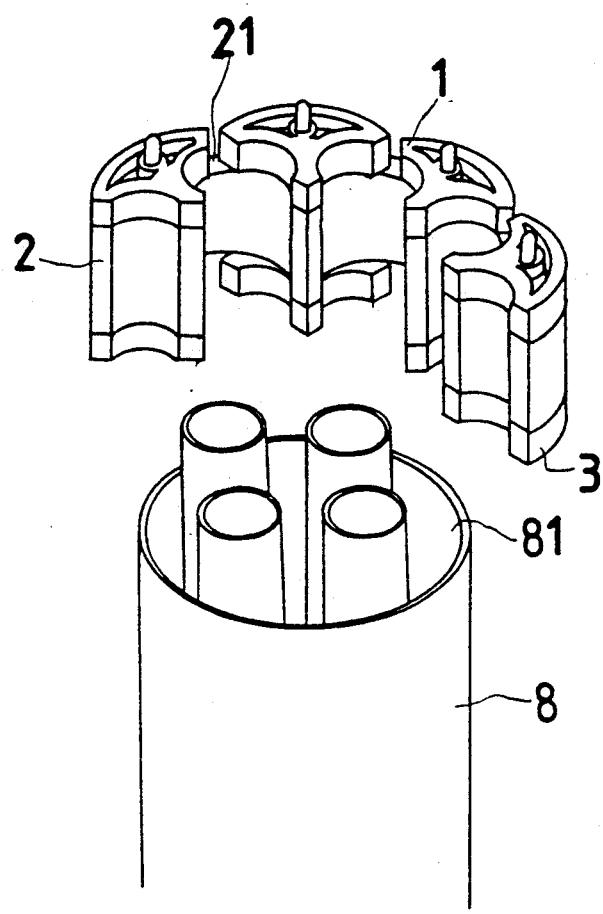
FIG. 8 is a further alternative embodiment of the expansion seal of this invention with four cable fitting holes.

As shown in FIG. 2 and 8, to cover the cable easily, the expansion seal is placed into the cable pipe, then the bolts (4) are fastened to fix the expansion seal on end of the cable pipe.

Figure 9:
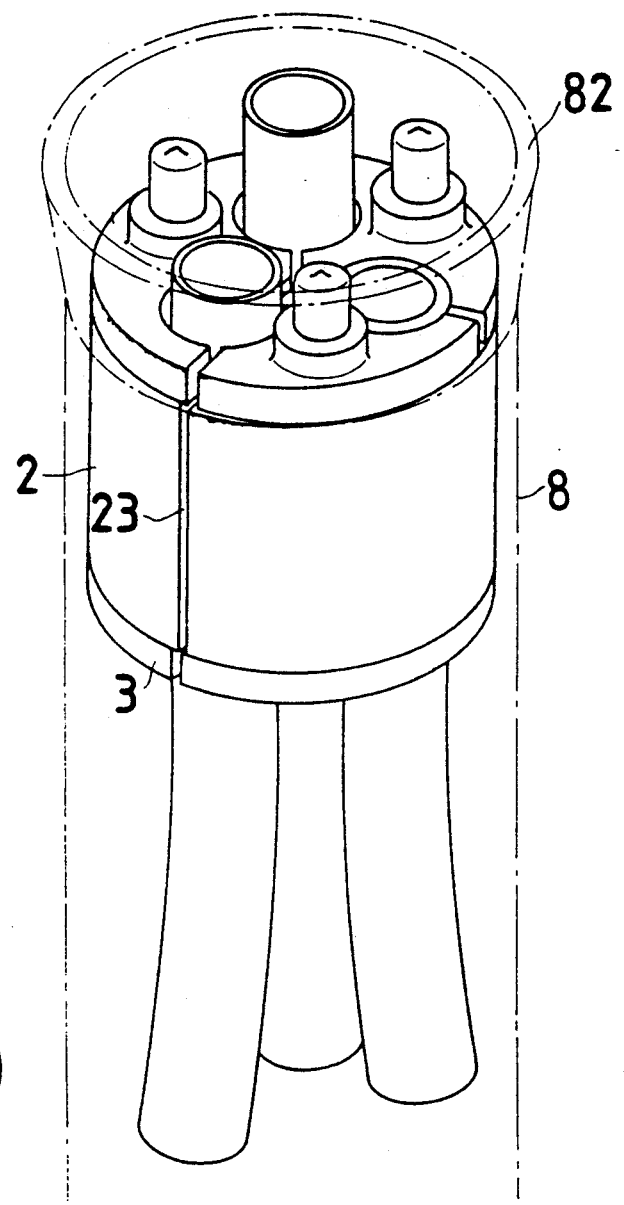
FIG. 9 is yet another embodiment of the expansion seal of this invention with three fitting holes applied to a cable pipe with a bellmouth shape at its end.
Figure 10:
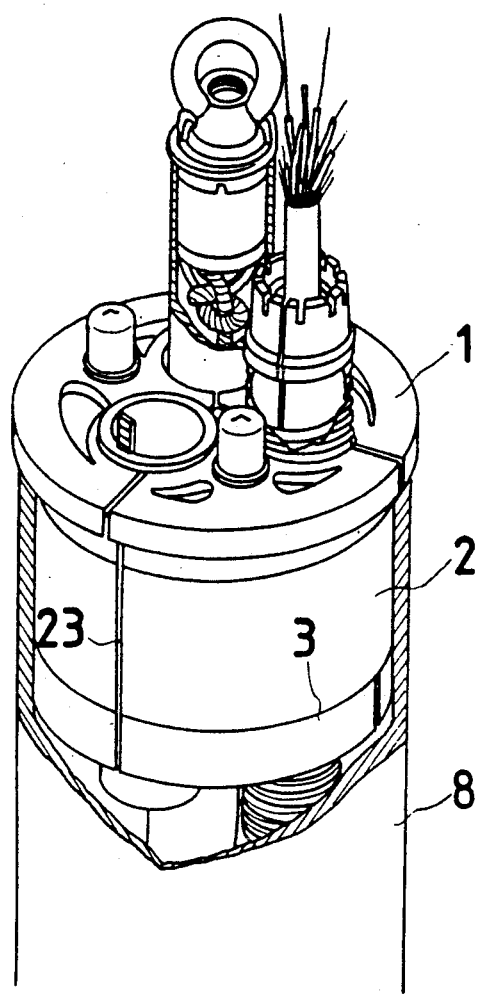
FIG. 10 is a further embodiment of the expansion seal of this invention with four fitting holes applied to a cable pipe with a plain end.
Figure 11:
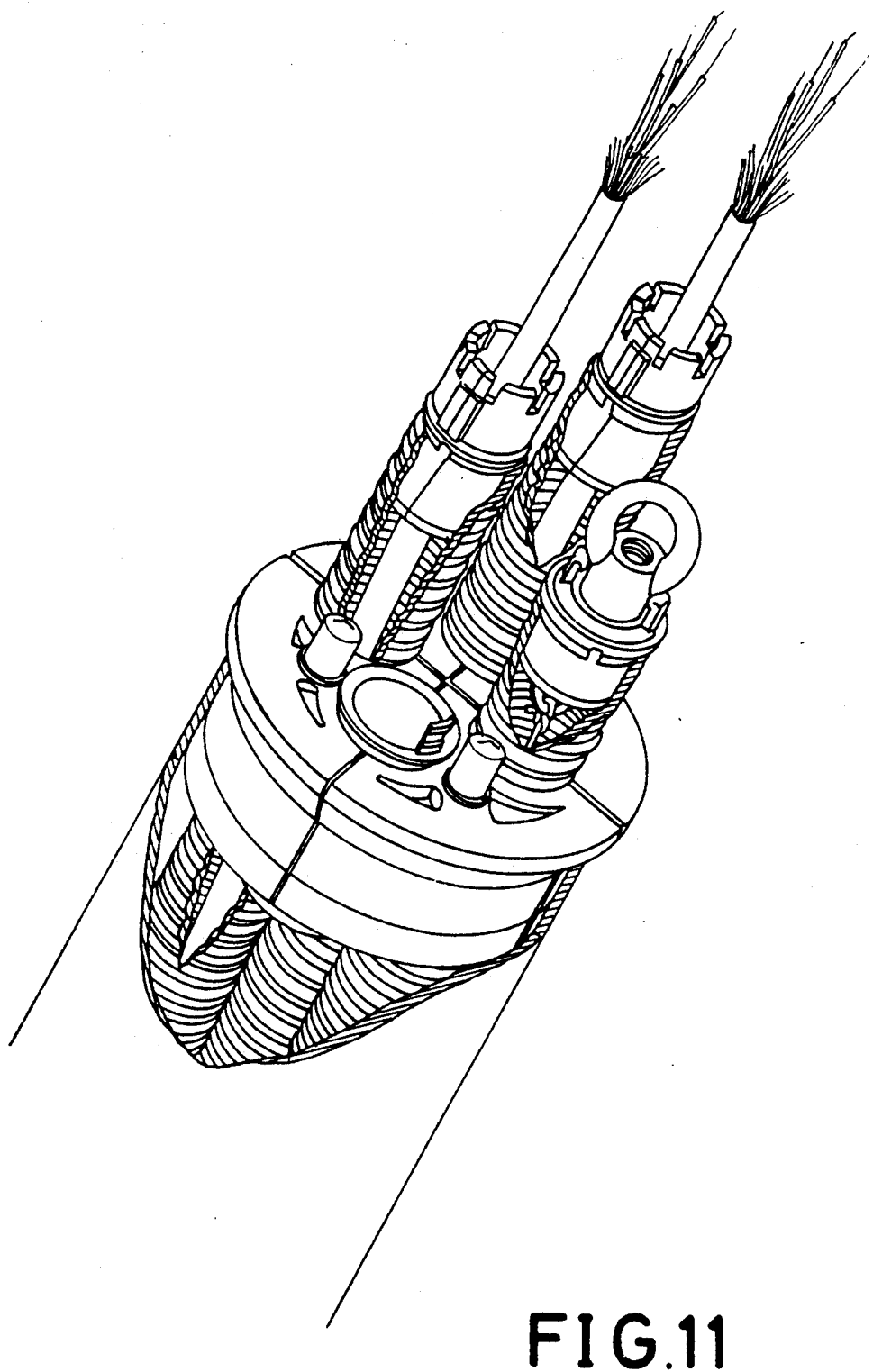
FIG. 11 is a perspective view of yet a further embodiment of the expansion seal of this invention with three fitting holes applied to a cable with a plain end.

Accordingly, the expansion seal for the cable pipe can be applied for a cable pipe with bellmouth (82) at its end (8) as shown in FIG. 9.

Figure 1:
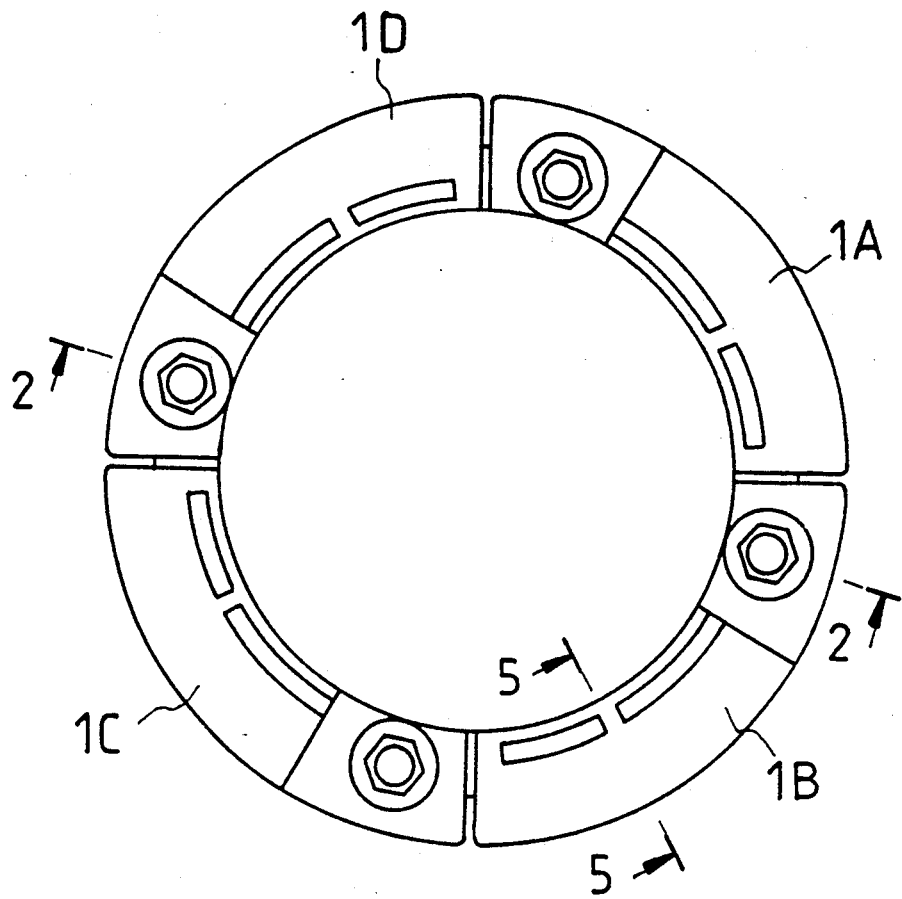
FIG. 1 is a top view of an expansion seal of the invention having a single hole.
Figure 3:
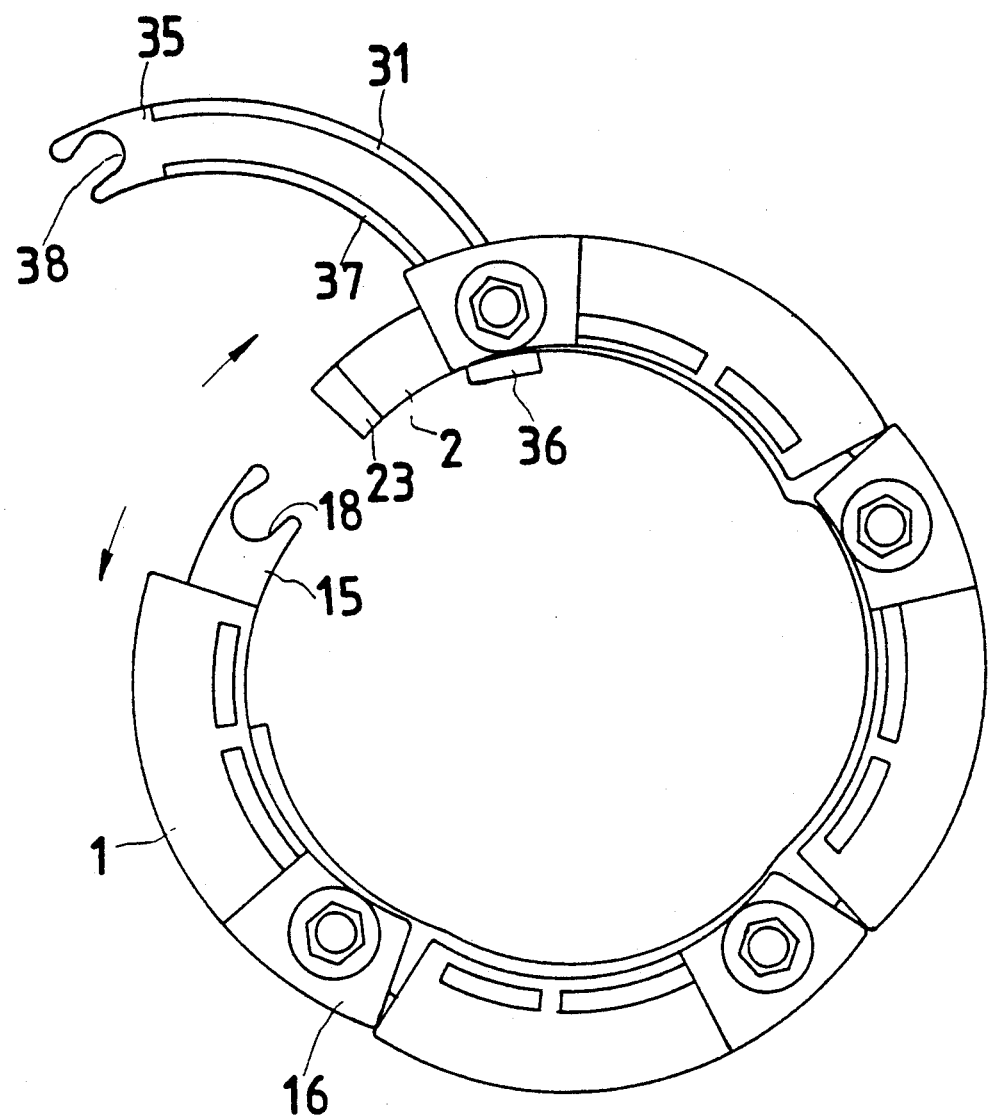
FIG. 3 is a top view similar to FIG. 1 illustrating the seal in an opened condition.
Figure 4:
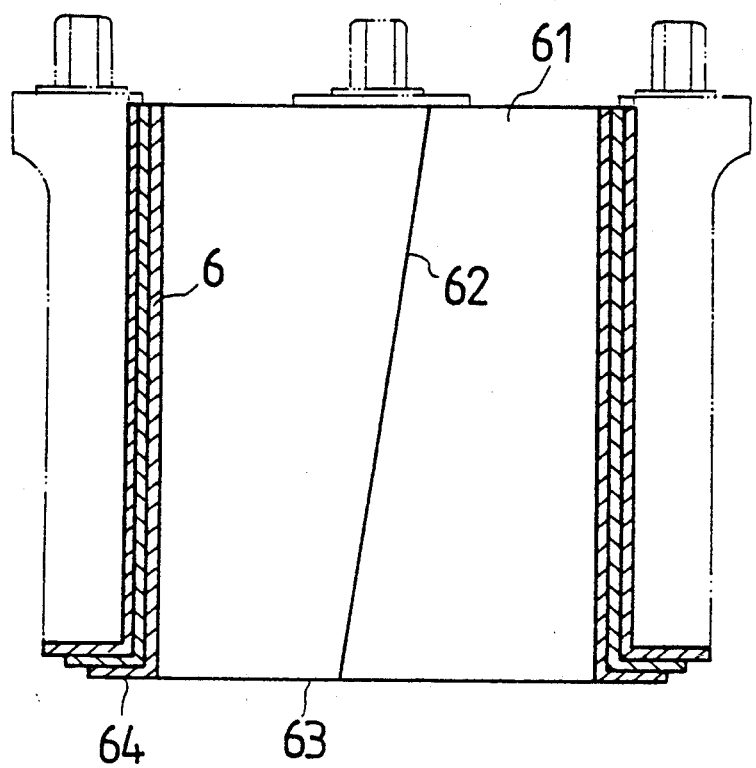
FIG. 4 is an alternative embodiment of an expansion seal of this invention.
Figure 5:
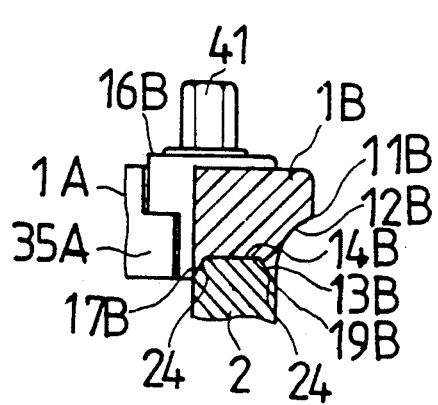
FIG. 5 is a sectional view of part of an upper clamping plate of the expansion seal on line 5—5 of FIG. 1.
Figure 6:
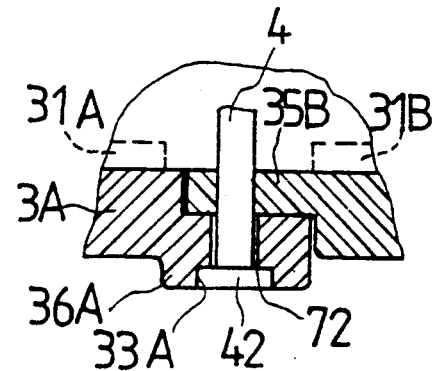
FIG. 6 is a sectional view of part of a lower clamping plate of the expansion seal on line 5—5 of FIG. 1.

FIG. 1 to FIG. 3 display the structure of the expansion seal having a single fitting hole, the upper clamping plate (1) comprising first and second steps (15), (16). The lower clamping plate (3) also comprises first and second steps (35), (36). The first steps (15), (35) have a surface (14), (34) which contacts the upper surface and lower surface (21) respectively of the elastic ring (2). The front of the first step (15), (35) has a clamp portion (18), (38) which can be fitted with the second step (16), (36) by the bolts (4). The gap between the first step (15), (35) and the second step (16), (36) is very little and therefore the compressive force can be transmitted to the elastic ring (2) equally, on the second step (16) of the upper clamping plate having a hole (72), and on the second step (36) of the lower clamping plate (3) having a recess hole (33) which is axially symmetrical to the hole (72). Thus the bolt (4) can be fixed on a fitting flange (42) of the recess hole (33) and extended through the hole (22) of the elastic ring (2) and through the hole (72) so as to match with gasket (5) and nut (41). The upper clamping plates (1) and lower clamping plates (3) are made of hard material such as brass, aluminum, hard plastics.

Figure 14:
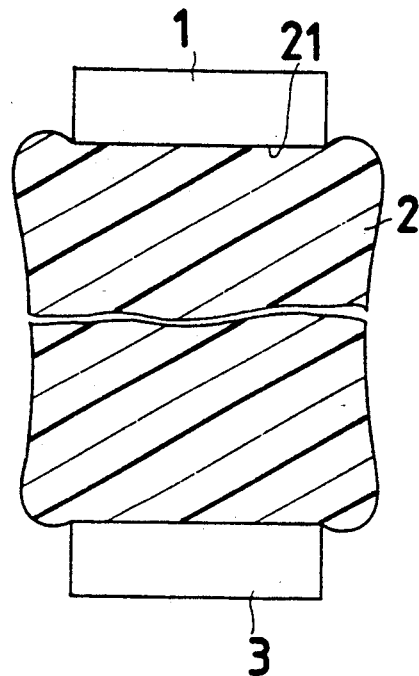
FIG. 14 is a part sectional view of an elastic ring for use in automatically adjusting the central axis of the expansion seal within a cable.
Figure 15:
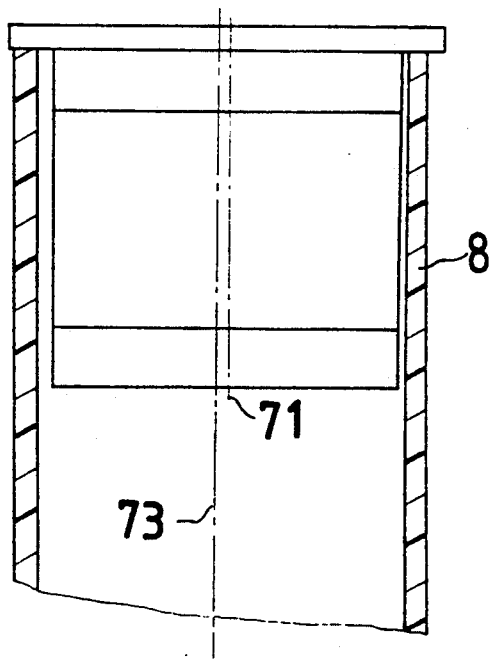
FIG. 15 is a part sectional view of an expansion seal illustrating the automatic adjustment of the center line thereof.

To achieve equal expansion of the elastic ring (2) and prevent the elastic ring (2) from escaping out of the upper clamping plates (1) and the lower clamping (3) when an increased compressive force is applied to it, the outer circumferences of the upper clamping plates (1A-1D) is formed into curve faces (12A-12D) from points (11A-11D) to points (19A-19D) and from the points (19A-19D) extending upward to contact the surfaces (14A-14D) forming slanted faces (13A-13D) at the inner circumferences of the upper clamping plates (1A-1D). These inner slant faces consist of slanted faces (17A-17D) of the first steps (15A-15D) which are symmetrical with the slant faces (13A-13D) at the outer circumferences and inner circumferences of the first steps (35A-35D), (37A-37D) which is symmetrical to slant faces (13A-13D), (17A-17D) as shown in FIG. 2. The edges of the upper surface and the lower surface (21) of the elastic ring (2) has slant faces (24) which can be matched with the slant faces (13A-13D), (17A-17D) of the upper clamping plates (1) and the slant faces (31A-31D), (37A-37D) of the lower clamping plates (3A-3D). Thus when fastening the bolts (4), the plastic ring (2) is be expanded outwardly equally in all directions and adjusted axially in accordance with the center line of the cable pipe. The upper and lower surfaces (2) of the elastic ring (2) are covered with the upper clamping plates (1) and the lower clamping plates (3) so that when fastening the bolts (4), the elastic ring (2) will be limited between the upper clamping plates (1A-1D) and the lower clamping plates (3A-3D). If the surfaces (14A-14D) of the first steps (15A-15D) of the upper clamping plates (1A-1D) and the surfaces (34A-34D) of the first steps (35A-35D) of the lower clamping plates (3A-3D) are flat surfaces without any slant faces, as shown in FIG. 15, then when fastening the bolts (4), the center line (73) of the cable pipe and the center line (71) of the elastic ring (2) are not co-axial and the compressive forces cannot be distributed equally over elastic ring (2). Therefore, the elastic ring (2) will distort or escape from the upper clamping plates (1) and the lower clamping plates (3) as shown in FIG. 14.

Figure 12:
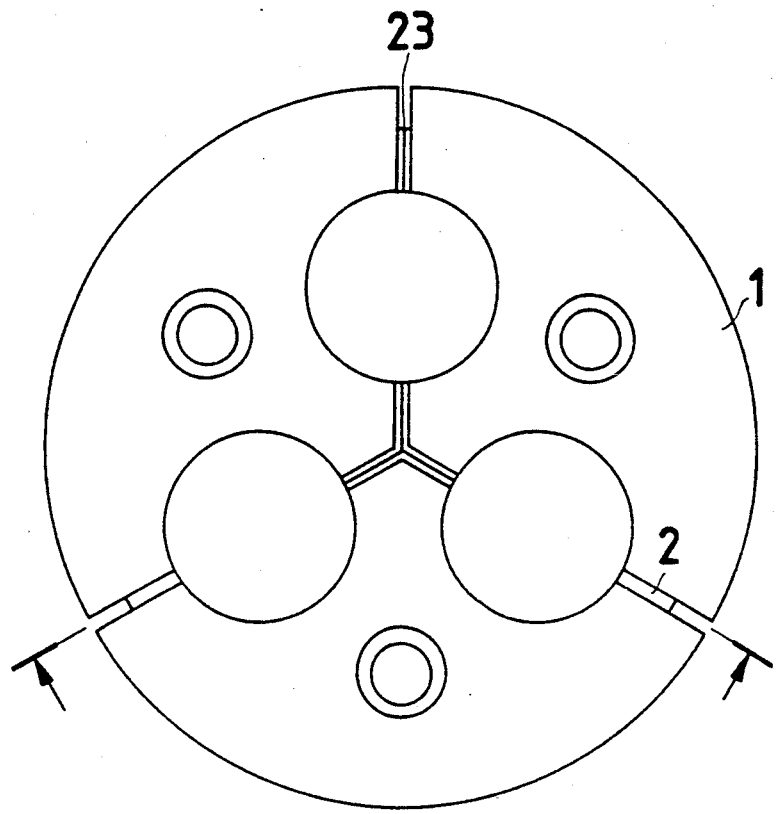
FIG. 12A is an end view and FIG. 12B a section view on line 12—12 of FIG. 12A of an expansion seal of this invention with three cable fitting holes.
Figure 12:
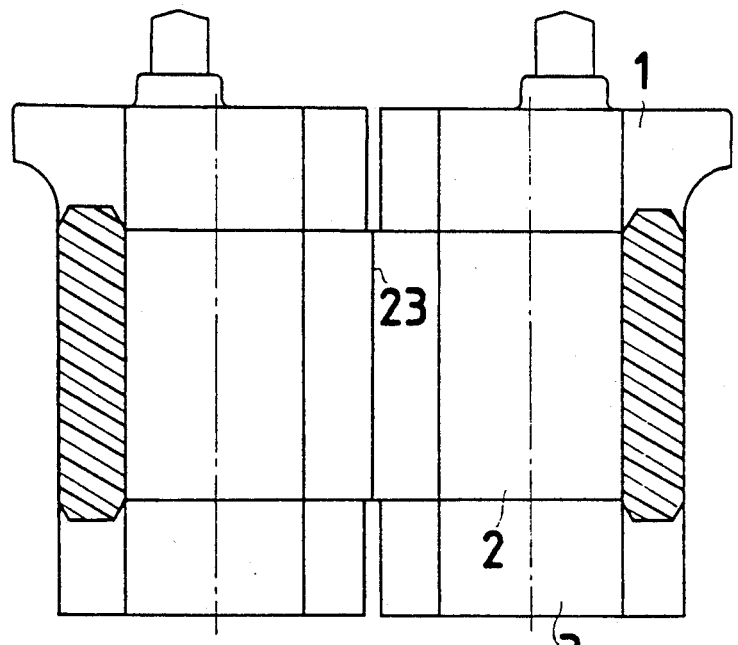
Figure 13:
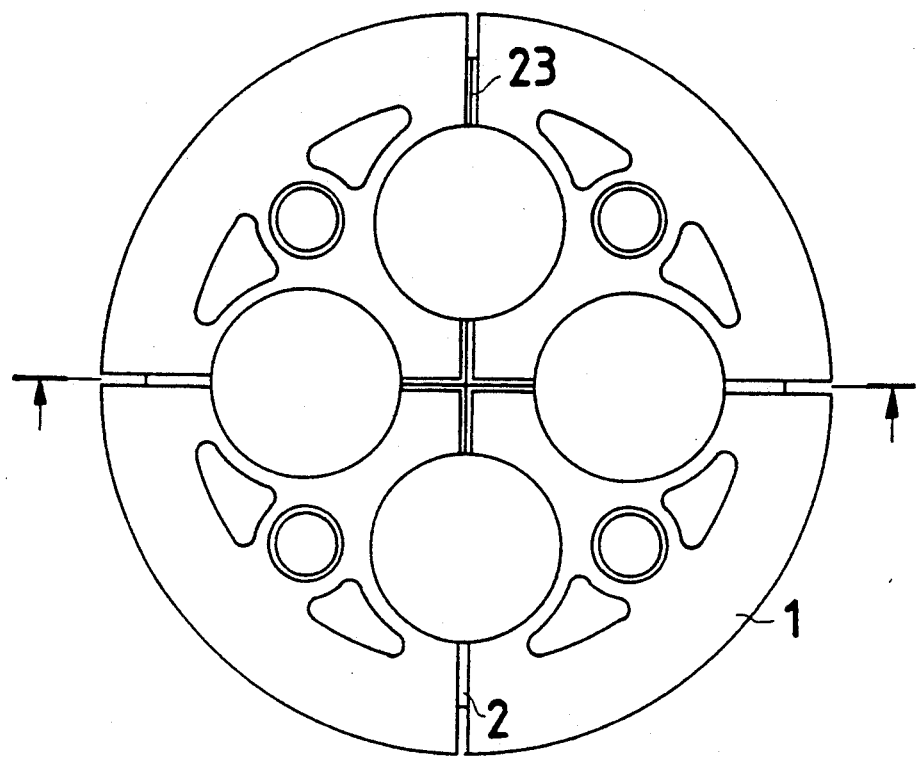
FIG. 13A is an end view and FIG. 13B a part sectional view on line 13—13 of FIG. 13A of an expansion seal of this invention with four fitting holes.
Figure 13:
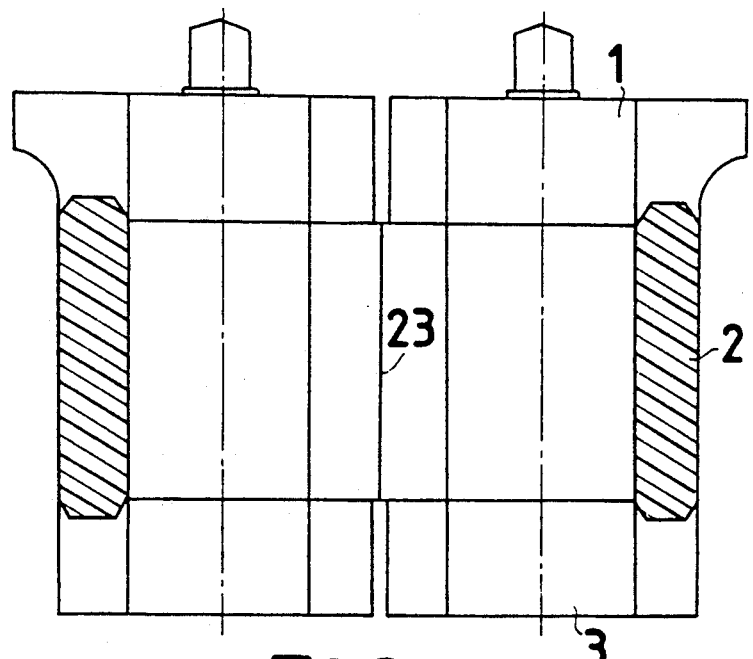

This invention is designed for use with expansion seals having two fitting holes, three fitting holes or four fitting holes as shown in FIG. 12 and FIG. 13. The method of operation of the these additional seals is similar to this invention which has been disclosed with reference to a single hole seal as described above.

The elastic ring (2) can be cut to form a slant slit (23) so that the compressive force can be distributed over the contact face of the slant slit (23)

The elastic ring (2) can be drawn into a rectangular shape from the slant slit (23), meanwhile the upper clamping plates (1) and the lower clamping plates (3) are drawn so as to cover cable easily as shown in FIG. 3.

The expansion seal described can be used with cable pipe of various outside diameters and the elastic ring (2) can be fitted with various diameter pipe sleeves (6) in the inner wall of the elastic ring (2). The various diameter pipe sleeves (6) are made of elastic type material such as soft plastics, rubber etc. and can be cut to form slant slits (62) so as to cover the cable easily. The diameter pipe sleeves (6) each have a flange (64) so that when these pipe sleeves (6) are located in the elastic ring (2), the flanges (64) prevents these pipe sleeves (6) from escaping out of the elastic ring (2). Therefore, the user can choose the most appropriate combination by adding or removing these pipe sleeves (6) to match the cable diameter. Accordingly, if the seal of this invention has two fitting holes, three fitting holes or four fitting holes, the slant slit (23) of the elastic ring (2) and the slant slits (62) of the various diameter pipe sleeves (6) can be drawn outwardly to cover the cable easily, whereupon the elastic ring (2) and the various diameter pipe sleeves (6) are placed into the cable pipe and fastened by the bolts (4) so as to form a seal.

I claim:

1. An expansion seal for cable pipe sleeve comprising a plurality of upper and lower clamping plates having frusto conical surfaces thereon, an elastic ring, having a central axis, upper and lower surfaces and inner and outer circumferential surfaces, said ring located between the upper and lower clamping plates and having a slit formed therein at an angle relative the central axis of said ring, a plurality of symmetrical through holes located parallel to the said axis, said ring having bevelled faces on the upper surface and the lower surface thereof, the faces disposed at acute angles to the inner circumferential and the outer circumferential surfaces of said ring; and a plurality of connecting elements arranged to interconnect the upper and lower clamping plates with said ring compressed therebetween.

2. An expansion seal as claimed in claim 1, wherein the upper clamping plates and the lower clamping plates comprise first and second steps.

3. An expansion seal as claimed in claim 2, wherein the first step has a bottom surface arranged to contact the upper surface of the elastic ring, the first step also having a clamping portion which is connectable with the second step of another clamping plate by connecting elements.

4. An expansion seal as claimed in claim 2, wherein the first step and second step cooperate to ensure the compressive force of said connecting elements is distributed over said elastic ring.

5. An expansion seal as claimed in claim 2 wherein the second steps have at least one hole which is symmetrical to at least one of the through holes of the elastic ring.

6. An expansion seal as claimed in claim 2, wherein the upper clamping plates have respectively curved faces at their outer circumferences, the curved faces being formed from the bottom surfaces of the second steps of the upper clamping plates and extend respectively to one end, said upper clamping plates forming slant faces, at the inner circumferences of said upper clamping plates which are symmetrical to the outer curved faces, the inner slant faces and outer slant faces being matched with the upper surface of the elastic ring.

7. An expansion seal as claimed in claim 6 wherein the outer circumferences and the inner circumferences of the lower clamping plats have outer slant faces and inner slant faces which are symmetrical to the outer faces and inner slant faces, respectively, of the upper clamping plates and being matched with the lower surfaces of the elastic ring.

8. An expansion seal as claimed in claim 1, wherein each pipe sleeve is made of elastic material such as soft plastic or rubber and is cut forming a slant slit, at the end of said pipe sleeve having a terminal flange which extends outwardly.

* * * * *